United States Patent
Chen et al.

(10) Patent No.: US 10,565,516 B2
(45) Date of Patent: Feb. 18, 2020

(54) UPDATING PREDICTION MODEL

(71) Applicant: International Business Machines Corporation, Armonk, NY (US)

(72) Inventors: Dong Chen, Beijing (CN); Sier Han, Xi'an (CN); Long Jiao, Xi'an (CN); Jing Zhang, Xi'an (CN); Weicai Zhong, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 14/657,633

(22) Filed: Mar. 13, 2015

(65) Prior Publication Data

US 2015/0302318 A1 Oct. 22, 2015

(30) Foreign Application Priority Data

Apr. 18, 2014 (CN) .......................... 2014 1 0156471

(51) Int. Cl.
*G06N 20/00* (2019.01)
*G06F 17/18* (2006.01)

(52) U.S. Cl.
CPC .............. *G06N 20/00* (2019.01); *G06F 17/18* (2013.01)

(58) Field of Classification Search
CPC ...... G06N 99/00; G06N 99/005; G06N 20/00; G06F 17/18
USPC ........................................................ 706/12
See application file for complete search history.

(56) References Cited

U.S. PATENT DOCUMENTS

| 6,151,383 A * | 11/2000 | Xue .......................... A61B 6/00 378/108 |
| 2004/0179510 A1* | 9/2004 | Kuffner ................ G06K 7/0008 370/350 |
| 2007/0233435 A1* | 10/2007 | Bradski ................... G06F 17/18 703/2 |
| 2010/0063974 A1 | 3/2010 | Papadimitriou et al. |
| 2014/0012901 A1 | 1/2014 | Ruhl et al. |
| 2014/0282591 A1* | 9/2014 | Stich ..................... G06F 9/5061 718/104 |

(Continued)

OTHER PUBLICATIONS

RJ Frank, N Davey, and SP Hunt, "Time Series Prediction and Neural Networks", J. Intel. and Robotic Sys., vol. 31, pp. 91-103, 2001. (Year: 2001).*

(Continued)

*Primary Examiner* — Vincent Gonzales
(74) *Attorney, Agent, or Firm* — David B. Woycechowsky

(57) ABSTRACT

Updating a prediction model, where the prediction model is used for time series data, a computer selects a first prediction time window in an order from a plurality of prediction time windows associated with the prediction model, and predicts predicted values of the time series data at time points within the first prediction time window. The computer calculates a prediction error associated with the first prediction time window based on the one or more predicted values and one or more actual measured values of the time series data at the plurality of time points. The computer determines whether the prediction error is larger than a predefined error threshold associated with the first prediction time window, and in response to determining the prediction error is larger than the predefined error threshold, provides a notification of updating the prediction model.

12 Claims, 8 Drawing Sheets

(56) References Cited

U.S. PATENT DOCUMENTS

2015/0112900 A1* 4/2015 Ariyoshi ............. G06N 99/005
　　　　　　　　　　　　　　　　　　　　　706/12
2015/0120269 A1* 4/2015 Dannecker .......... G06F 17/5009
　　　　　　　　　　　　　　　　　　　　　703/18

OTHER PUBLICATIONS

ForecastPRO, "Forecasting 101: A Guide to Forecast Error Measurement Statistics and How to Use Them", http://www.forecastpro.com/Trends/forecasting101August2011.html, published Aug. 2011, accessed Nov. 29, 2017, 2 pages. (Year: 2011).*

S. Soman et al., "A review of wind power and wind speed forecasting methods with different time horizons", IEEE North American Power Symp. 2010, 8 pages. (Year: 2010).*

Chinese Patent Application No. 201410156471.1 filed Apr. 18, 2014.

* cited by examiner

UPDATING PREDICTION MODEL

BACKGROUND

Various embodiments of the present invention relate to prediction models, and more specifically, to a method and apparatus for updating a prediction model used for time series data.

With the development of technologies such as computer, data communication and real-time monitoring, time series data have been widely used in various respects such as device monitoring, production line management and financial analysis. Time series data refer to a set of measured values arranged in time order. For example, time series data may be stored in a database or in other manner.

Measured values may include various kinds of data. For example, in an application environment of monitoring users' access to an online banking system, measured values being collected may include users' access occurrences to the online banking system at various time points, time series data here may be stored as, for example, a sequence $x_1, x_2, \ldots, x_i, \ldots, x_n$, and data measured at the $i^{th}$ time point is a value $x_i$. In an application environment of weather forecasts, measured values being collected may be multivariate, and may include, for example, temperature, humidity, pressure, wind force, etc. At this point, 4 groups of time series data will be obtained, and data measured at the $i^{th}$ time point may be $tem_i$, $hum_i$, $pre_i$, and $wind_i$ respectively.

Typically value distribution of time series data follows a certain pattern, so future data changes may be predicted based on historical measured values that were collected in a past time period. For example, in the above example of monitoring users' access occurrences to an online banking system, various resource configurations in the online banking system may be adjusted accordingly based on predicted change of access occurrences, so as to be adapted to user access demands in different time periods and further increase resource utilization efficiency in the online banking system.

In the prior art, there have been developed technical solutions for building a prediction model based on historical measured values within a specific time period (e.g., training time window) and further for predicting values in a future given time period (e.g., prediction time window). However, prediction models often vary with the elapse of time. According to the existing technical solutions, it is impossible to ascertain whether an existing prediction model matches or does not match real measured values, so the prediction model has to be updated frequently with the elapse of time, which leads to a huge computation load. On the one hand, the prior art fails to provide a notification of when to update a prediction model and then generate a new prediction model; on the other hand, since after the updated new prediction model will depend on a selection of historical data, it becomes a focus of attention how to select an appropriate range of huge historical data for generating a new prediction model.

SUMMARY

Therefore, it is desired to develop a technical solution capable of efficiently updating a prediction model used for time series data, and it is desired the technical solution can detect whether an existing prediction model can accurately reflect future changes of the time series data (e.g., judging whether errors between predicted values and actual measured values are within a specific threshold range or not), and further provide a notification of updating the prediction model when errors exceed the predefined threshold.

According to one aspect of the present invention, there is provided a method for updating a prediction model, the prediction model being a prediction model used for time series data, comprising: selecting a first prediction time window h in an order from a plurality of prediction time windows associated with the prediction model; predicting predicted values $\hat{y}_k$ of the time series data at various time points k within the first prediction time window h based on the prediction model; calculating a prediction error MAPE associated with the first prediction time window h based on the predicted values $\hat{y}_k$ and actual measured values $y_k$ of the time series data at various time points k within the first prediction time window h; and providing a notification of updating the prediction model in response to the prediction error MAPE being larger than or equal to a predefined error threshold associated with the first prediction time window h.

According to one aspect of the present invention, there is provided a method for updating a prediction model, the prediction model being a prediction model used for time series data, comprising: in response to receiving a notification of updating the prediction model, obtaining a first prediction time window h associated with the notification and a first training time window associated with the prediction model, wherein the notification is provided according to the above-described method; calculating a total accumulative error $ACC_h$ associated with the first training time window and the first prediction time window; extracting a range of time points such that a ratio of an accumulative error $ACC_{w'}$ between actual measured values and predicted values of the time series data within the range to the total accumulative error $ACC_h$ is greater than or equal to a predefined ratio; and providing the range of time points as a second training time window for updating the prediction model.

According to one aspect of the present invention, there is provided an apparatus for updating a prediction model, the prediction model being a prediction model used for time series data, comprising: a selecting module configured to select a first prediction time window h in an order from a plurality of prediction time windows associated with the prediction model; a predicting module configured to predict predicted values $\hat{y}_k$ of the time series data at various time points k within the first prediction time window h based on the prediction model; a calculating module configured to calculate a prediction error MAPE associated with the first prediction time window h based on the predicted values $\hat{y}_k$ and actual measured values $y_k$ of the time series data at various time points k within the first prediction time window h; and a providing module configured to provide a notification of updating the prediction model in response to the prediction error MAPE being larger than or equal to a predefined error threshold associated with the first prediction time window h.

According to one aspect of the present invention, there is provided an apparatus for updating a prediction model, the prediction model being a prediction model used for time series data, comprising: an obtaining module configured to, in response to receiving a notification of updating the prediction model, obtain a first prediction time window h associated with the notification and a first training time window associated with the prediction model, wherein the notification is provided according to the above-described apparatus; a calculating module configured to calculate a total accumulative error $ACC_h$ associated with the first training time window and the first prediction time window;

an extracting module configured to extract a range of time points such that a ratio of an accumulative error $ACC_{w'}$ between actual measured values and predicted values of the time series data within the range to the total accumulative error $ACC_h$ is greater than or equal to a predefined ratio; and a providing module configured to provide the range of time points as a second training time window for updating the prediction model.

By means of the method and apparatus of the present invention, it is reminded when to update an existing prediction model while altering the architecture of an existing prediction method as less as possible.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
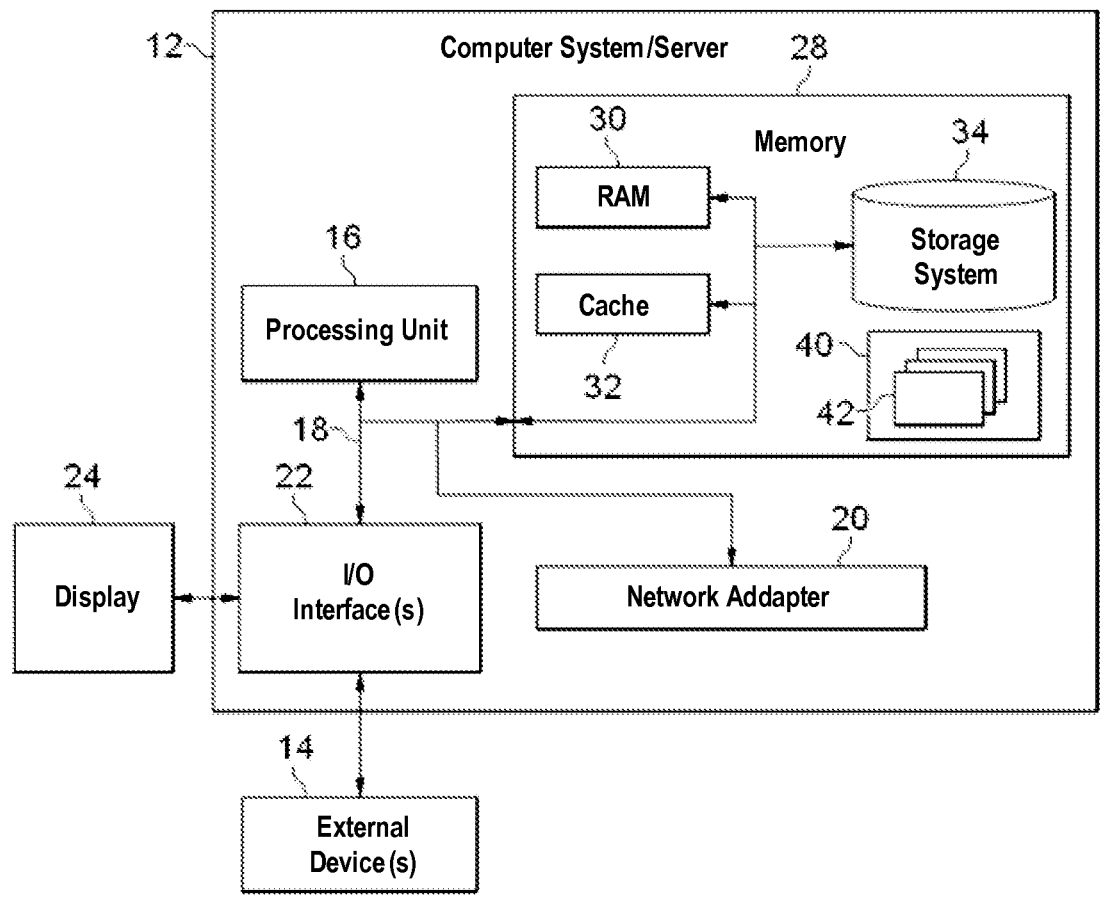
FIG. 1 shows an exemplary computer system/server which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interface(s) 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
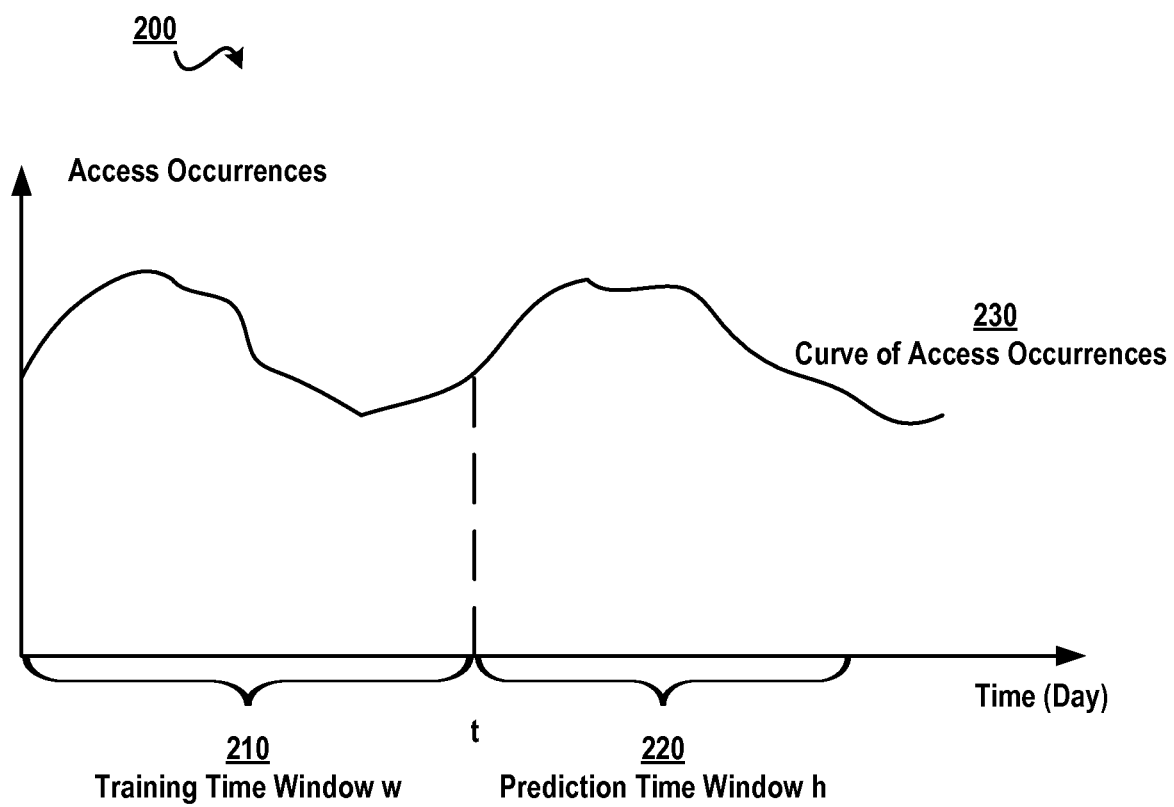
FIG. 2 shows a schematic view of a method for updating a prediction model used for time series data according to one existing technical solution.

FIG. 2 shows a schematic view 200 of a method for updating a prediction model used for time series data according to one existing technical solution. Referring to FIG. 2, description is presented to various embodiments of the present invention by continuing the above example of monitoring users' access occurrences (230) to an online banking system. In FIG. 2, the horizontal axis represents time, and the vertical axis represents users' access occurrences to the online banking system. In the horizontal axis, for example, such a time unit as "day" may be used to represent time intervals that data is collected in time series data. For example, FIG. 2 shows the frequency of collecting data is once a day. Note in this disclosure "day" is only for illustration, and in other application environments, shorter or longer time intervals like "hour," "minute" and "second" may further be used without departing from principles of the present invention.

According to the solution in the prior art, a prediction model is generated based on historical data collected within a training time window w 210 (where w represents the number of data points within the training time window) at a time point t (representing current time) shown in FIG. 2, and predicted values at various time points within a future prediction time window h 220 (wherein h represents the number of data points within the prediction time window) are predicted using the prediction model.

In this technical solution, training time window w 210 and prediction time window h 220 slide rightwards in FIG. 2 along a direction shown by the time axis with the elapse of time. For example, when time goes to the day following t (i.e., t+1), training time window w 210 and prediction time window h 220 slide rightwards accordingly (step size being 1 day). According to this technical solution, since it is unclear whether a current prediction model can accurately reflect the change trend of time series data, a second, or new, prediction model has to be generated based on the slid training time window every day, which will consume a large amount of computation resources. In view of this drawback, it is desired to determine whether a current prediction model can accurately reflect the change trend of time series data, and to remind an update operation is to be performed when the current prediction model is not accurate any longer.

In addition, according to the existing technical solution, every time a new prediction model is generated, the generation is implemented based on a training time window with fixed size. This will cause a couple of problems. For example, when a value of w is too large, the generated training model can hardly reflect the change trend of time series data; however, when a value of w is too small, the noise in historical data will prejudice the accuracy of the generated training model. Therefore, there is a need to provide a technical solution capable of conveniently, rapidly determining how to select historical data (i.e., training time window) on the basis of which a new training model is generated.

Figure 3A:
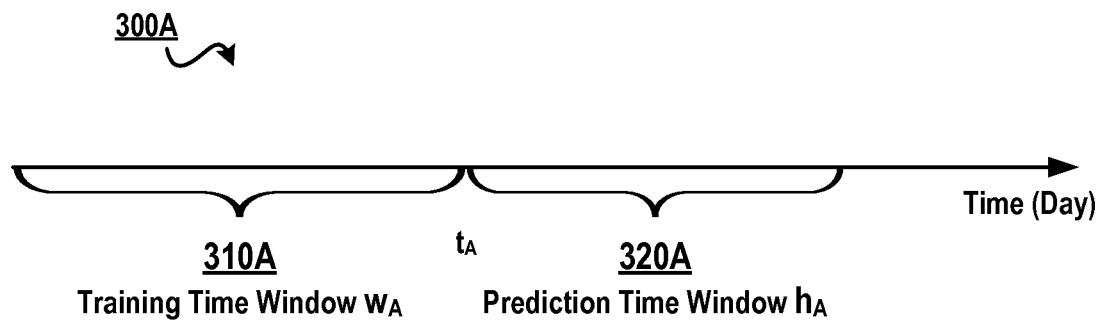
FIGS. 3A and 3B show schematic views of a training time window and a prediction time window according to the embodiments of the present invention, respectively.
Figure 3B:
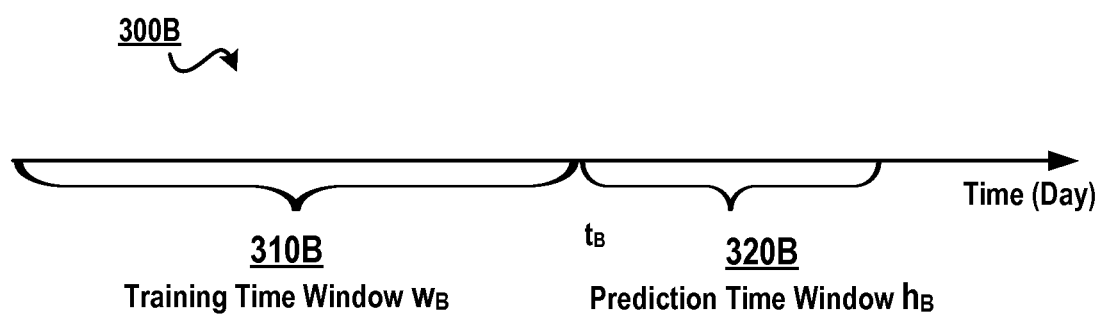

In view of the drawbacks in the above technical solution, the present invention provides an embodiment for updating a prediction model used for time series data. Specifically, FIGS. 3A and 3B show respective schematic views 300A and 300B of a training time window and a prediction time window according to the embodiments of the present invention. In this embodiment, an error threshold may be set in advance; with the elapse of time, when a difference between a predicted value based on a first, or current, prediction model and an actual measured value is larger than or equal to the error threshold, then it is prompted the current prediction model is to be updated. The present invention further proposes an embodiment for selecting a training time window on the basis of which a second, or new, training model is generated. According to the embodiment of the present invention, after an update notification is received, a time period that best reflects the change trend of time series data may be selected from past time periods as a training time window for generating a new prediction model, so as to generate a more accurate new prediction model based on a smaller data amount.

According to the above principles of the present invention, as time elapses, sizes of a training time window and a prediction time window may vary. For example, in the example shown in FIG. 3A, a training time window $w_A$ 310A and a prediction time window $h_A$ 320A may be used at a current time point $t_A$; in the example shown in FIG. 3B, a training time window $w_B$ 310B and a prediction time window $h_B$ 320B may be used at a current time point $t_B$. At different moments, sizes of the training time window and the prediction time window may be adjusted with the change trend of time series data.

Figure 4:
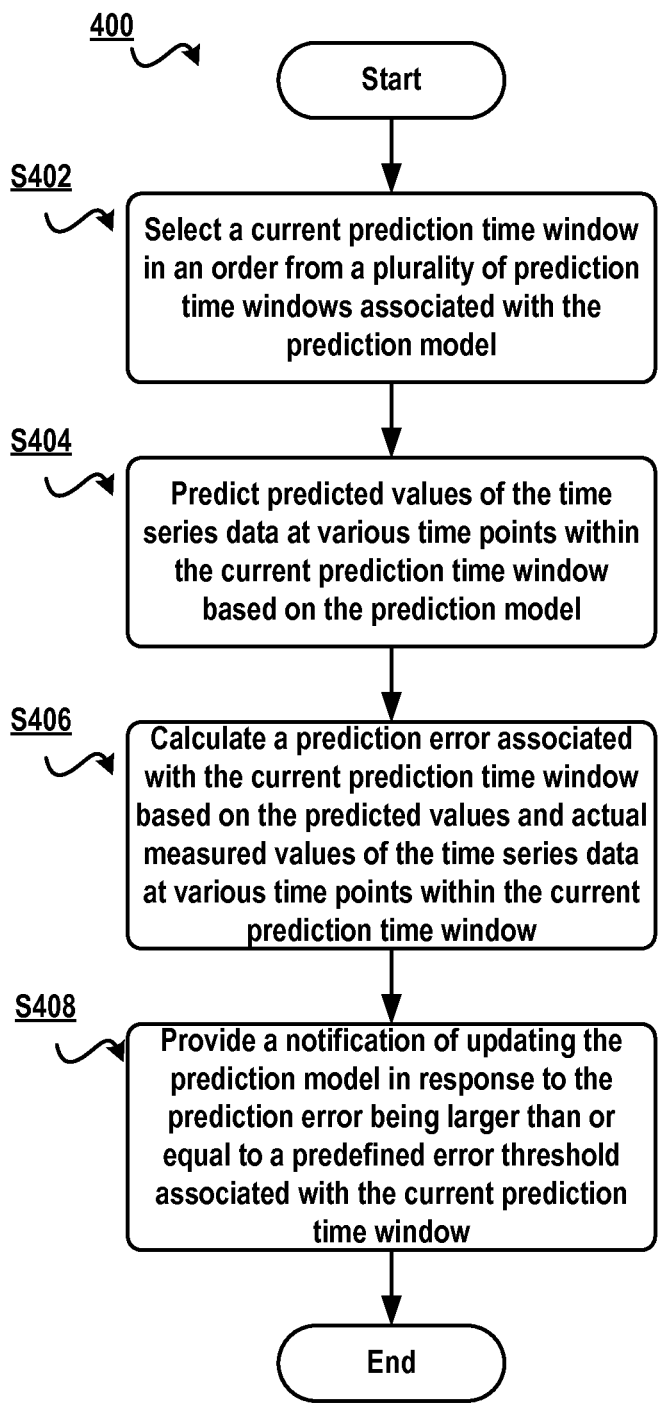
FIG. 4 shows a flowchart of a method for updating a prediction model used for time series data according to one embodiment of the present invention.

Specifically, FIG. 4 shows a flowchart 400 of a method for updating a prediction model used for time series data according to one embodiment of the present invention. As shown in FIG. 4, in step S402, a first, or current, prediction time window, h, is selected in an order from a plurality of prediction time windows associated with the prediction model. In this embodiment, a plurality of prediction time windows that cover future different time periods may be set, and an appropriate prediction time window is selected with the elapse of time. Specifically, a prediction time window 1 (covering a time period of h days starting from a current time point t, represented as a range (t+1, t+h]), and a prediction time window 2 may further be set (covering a time period of h days starting from the end point of prediction time window 1, represented as a range (t+h+1, t+2h]). Specifically, when the accuracy of the prediction model is not reduced significantly in the range (t+1, t+h], the model's accuracy is further checked in the next range (t+h+1, t+2h].

In step S404, predicted values, $\hat{y}_k$, of the time series data at various time points, k, within the current prediction time window h are predicted based on the prediction model. In this step, prediction may be conducted with respect to each time point within the current prediction time window h; for example, predicted values may be recorded as $\hat{y}_1, \hat{y}_2, \ldots, \hat{y}_k, \ldots, \hat{y}_h$.

In step S406, prediction error "MAPE" associated with the current prediction time window h is calculated based on the predicted values $\hat{y}_k$ and actual measured values, $y_k$, of the time series data at various time points k within the current prediction time window h. In this step, actual measured values $y_k$ (e.g., actual measured values may be recorded as $y_1, y_2, \ldots, y_k, \ldots, y_h$) of the time series data at various time points k within the current prediction time window h may further be collected, so as to calculate differences between corresponding measured values and predicted values and further calculate prediction error MAPE within the current prediction time window h. Those skilled in the art may define by themselves a concrete formula for solving the prediction error MAPE, which will be described in detail in the context of an example.

Finally in step S408, a notification of updating the prediction model is provided in response to the prediction error MAPE being larger than or equal to a predefined error threshold associated with the current prediction time window h. In one embodiment of the present invention, a corresponding predefined error threshold may be set with respect to each of a plurality of prediction time windows. In this step, whether the prediction model needs to be updated is determined by judging whether the prediction error MAPE calculated in step S406 is larger than or equal to a corresponding predefined error threshold. In this manner, the prediction model is reminded to be updated when the prediction model fails to accurately reflect actual changes of the time series data.

Note the method described by the above steps may be executed with respect to a current time window h selected from a plurality of prediction time windows in each of a plurality of rounds. In each round, if it is found the prediction error MAPE is larger than or equal to a predefined error threshold associated with the current prediction time window h, then a notification of updating the prediction model is provided and the method ends; otherwise, if it is found the prediction error MAPE is neither larger than nor equal to a predefined error threshold associated with the current prediction time window h, then the flow proceeds to operations in the next round, i.e., sequentially selecting a next prediction time window h from a plurality of prediction windows and continuing to execute the above method with respect to a newly selected current prediction time window h.

Further note those skilled in the art may generate a prediction model by using various methods that are known in the prior art or to be developed in future, and a concrete example of how to generate a prediction model will be omitted in this disclosure.

As described above, a plurality of prediction time windows may be set; now detailed description is presented to further details of these prediction time windows. In one embodiment of the present invention, the number of time points within a plurality of prediction time windows is variable. For example, prediction time windows used for short-term prediction, mid-term prediction and long-term prediction may be set according to the number of time points within prediction time windows. Specifically, continuing the above example, regarding short-term prediction, for example, the size of a prediction time window may be set as 3 days (i.e., including 3 time points); regarding mid-term prediction, the size of a prediction time window may be set as 6 days; and regarding long-term prediction, the size of a prediction time window may be set as 12 days.

With reference to the example shown in FIG. 4, an appropriate prediction time window may be selected with the elapse of time. For example, initially suppose current time is t, and when time advances to 0-3 days following the time t, a short-term prediction time window (3 days) may be selected; when time advances to 4-6 days following the time t, a mid-term prediction time window (6 days) may be selected.

In one embodiment of the present invention, the predefined error threshold associated with the current prediction time window h varies as the number of time points within the current prediction time window h varies. Since the prediction time window may comprise different numbers of time points, with respect to different sizes of prediction time windows, the capability of the calculated prediction error MAPE as to judging whether the prediction model can accurately reflect the change trend of time series data is also varying. Therefore, different predefined error thresholds may be set with respect to different prediction time windows.

Generally speaking, the change trend of measured values collected in larger scope (e.g., long-term prediction time window) is relatively smooth, while the change trend of measured values collected in smaller scope (e.g., short-term prediction time window) is rather abrupt. Accordingly, the prediction error MAPE with respect to a long-term prediction time window is usually much smaller than the prediction error MAPE with respect to a short-term prediction time window. Thereby, a smaller predefined error threshold may be set for a long-term prediction time window, while a larger predefined error threshold may be set for a short-term prediction time window.

In one embodiment of the present invention, the predefined error threshold associated with the current prediction time window h decreases as the number of time points within the current prediction time window h increases. For example, a relationship between the predefined error threshold and the number of time points within the current prediction time window h may be described in a discrete function form. For example, a predefined error threshold of 8% may be set for a long-term prediction time window consisting of 10-20 time points.

In one embodiment of the present invention, the plurality of prediction time windows are divided into a plurality of levels according to the number of time points within the plurality of prediction time windows. In one embodiment of the present invention, predefined error thresholds associated with prediction time windows at the same level are equal to one another. Specifically, values as recorded in Table 1 below may be used as predefined error thresholds.

TABLE 1

Example of Predefined Error Thresholds

| No. | Level | Predefined Error Threshold |
|---|---|---|
| 1 | long-term | 8% |
| 2 | mid-term | 10% |
| 3 | short-term | 12% |

As shown in Table 1 above, three levels of prediction time windows may be provided: long-term windows (12 days), mid-term windows (6 days) and short-term windows (3 days), and moreover, corresponding predefined error threshold may be set with respect to various levels of prediction time windows, e.g., 8%, 10% and 12% respectively.

In one embodiment of the present invention, starting time points of the plurality of prediction time windows are variable. In the embodiments of the present invention, it is not limited whether each prediction time windows starts from a current time point but may start from any feasible time point after the current time point. Specifically, with reference to FIG. 5, detailed description is presented to details of prediction time windows.

Figure 5:
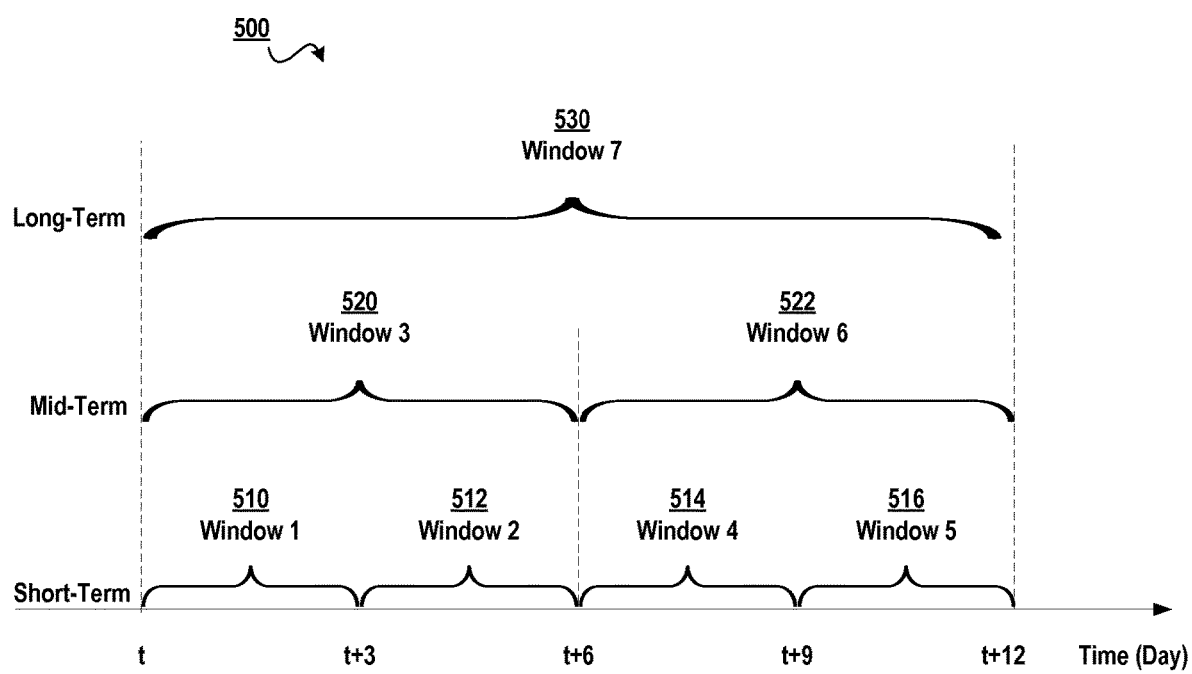
FIG. 5 shows a schematic view of multiple levels of prediction time windows according to one embodiment of the present invention.

FIG. 5 shows a schematic view 500 of multiple levels of prediction time windows according to one embodiment of the present invention. As shown in FIG. 5, three grades of prediction time windows may be provided: long-term windows (12 days), mid-term windows (6 days) and short-term windows (3 days). Specifically, as shown in FIG. 5, short-term windows may include: a window 1 510 (with a time range of (t, t+3]), a window 2 512 (with a time range of (t+3, t+6]), a window 4 514 (with a time range of (t+6, t+9]), and a window 5 516 (with a time range of (t+9, t+12]). Mid-term windows may include: a window 3 520 (with a time range of (t, t+6]), and a window 6 522 (with a time range of (t+6, t+12]). Long-term windows may include: a window 7 530 (with a time range of (t, t+12]).

In one embodiment of the present invention, numbers of time points within the plurality of prediction time windows may be equal (e.g., both numbers of time points within window 1 510 and window 2 512 are 3) or different (e.g., numbers of time points within window 1 510 and window 3 520 are 3 and 6 respectively). In one embodiment of the present invention, starting time points of the plurality of prediction time windows may be the same (e.g., both starting time points of window 1 510 and window 3 520 are t) or different (starting time points of window 1 510 and window 2 512 are t and t+3, respectively).

Note the multiple levels of prediction time windows shown in FIG. 5 merely illustrate an embodiment of the present invention. Those skilled in the art should understand other embodiments may be implemented based on different application environments without departing from the principle of the present invention. For example, more or fewer levels may be set, mid-term windows may include a larger number of short-term windows, etc.

By providing multiple levels of prediction time windows, an appropriate prediction time window may be selected from the multiple levels of prediction time windows with the elapse of time. As long as the prediction error MAPE with respect to any prediction time window h is larger than or equal to a predetermined error threshold associated with the prediction time window h, a notification of updating the prediction model is provided; otherwise, the existing prediction model may be used still. Thereby, an existing prediction model may be updated when it is no longer accurate, instead of frequently updating the prediction model with the elapse of time in the prior art.

In one embodiment of the present invention, when the prediction error MAPE is larger than or equal to a predefined error threshold associated with the current prediction time window h, a notification of updating the prediction model may be provided. At this moment, since it is found the prediction model is no longer accurate, the above method may stop, and processing is no longer performed with respect to the next window among the plurality of prediction time windows.

In one embodiment of the present invention, the order comprises at least one of: an increasing order by numbers of time points within the plurality of prediction time windows; a time order of starting points of the plurality of prediction time windows; and a random order.

With the elapse of time, an appropriate prediction time window may be selected according to at least one of the above orders. For example, when the selection is made in an increasing order by numbers of time points within the plurality of prediction time windows, window 1 510, window 3 520 and window 7 530 may be selected in an order of short term-mid term-long term as shown in FIG. 5; when the selection is made according to a time order of starting points of the plurality of prediction time windows, window 1 510, window 2 512, . . . may be selected. When the above two orders are combined, window 1 510, window 2 512, window 3 520, window 4 514, window 5 516, window 6 522 and window 7 530 may be selected in order. Further, those skilled in the art may select one window from these 7 windows at random, or select one window from a plurality of short-term windows at random where these windows are selected according to numbers of time points within prediction time windows or the time order of starting points.

Note an example of how to select windows has been illustrated with reference to various windows in FIG. 5. Without departing from the principle of the present invention, those skilled in the art may further use other selection criterion according to own needs, e.g., selecting from a plurality of windows at random.

In one embodiment of the present invention, the calculating a prediction error MAPE associated with the current prediction time window h based on the predicted values $\hat{y}_k$ and actual measured values $y_k$ of the time series data at various time points k within the current prediction time window h comprises: calculating errors, using Equation 1, between the predicted values $\hat{y}_k$ and actual measured values $y_k$ of the time series data at various time points k within the current prediction time window h. Calculating the prediction error is done using Equation 2.

$$e_k = \left| \frac{y_k - \hat{y}_k}{y_k} \right| \qquad \text{Equation 1}$$

$$MAPE = \frac{1}{h} \sum_{k=1}^{h} e_k \qquad \text{Equation 2}$$

In the context of the present invention, since the measured value $y_k$ might be greater than or less than the predicted value $\hat{y}_k$, an error between these two values may be solved in the embodiments of the present invention. In other words, as long as there is a difference between the measured value $y_k$ and the predicted value $\hat{y}_k$ (no matter whether the difference is positive or negative), it may be considered the prediction model does not match with actual measured values to some degree. From above Equation 1 and Equation 2, the prediction error MAPE with respect to the current prediction time window h may be calculated, and a notification of updating the prediction model is provided when the prediction error MAPE is greater than or equal to the associated predefined error threshold (i.e., the degree of mismatching reaches the threshold).

Those skilled in the art should note although an example of calculating "relative errors" between the predicted values $\hat{y}_k$ and the actual measured values $y_k$ at various time points k within the current prediction time window h has been presented above, those skilled in the art may further measure errors between the predicted values $\hat{y}_k$ and the actual measured values $y_k$ by other means. Specifically, the absolute error may be calculated on the basis of an equation $e_k = |y_k - \hat{y}_k|$, or the square error may be calculated on the basis of an equation $e_k = (y_k - \hat{y}_k)^2$, or other specific equations may be used.

Those skilled in the art should note although a concrete equation of calculating the prediction error MAPE has been presented above, they may further use other equations according to a situation of an application environment. For example, the prediction error MAPE may be calculated using a maximum error in the current prediction time window h, a sum of maximum errors, a mean value of multiple maximum errors, or other error function.

Alternatively, in addition to setting corresponding predefined error thresholds with respect to different prediction time windows, an additional condition may further be set with respect to different prediction time windows. That is, a notification of updating the prediction model is provided only when the following two conditions are satisfied: 1) the prediction error MAPE with respect to the current prediction time window h is greater than or equal to the corresponding predefined error threshold, 2) an additional condition is satisfied.

In the context of an equation, description is now presented to the additional condition that needs to be satisfied when providing a notification of updating the prediction model. Since short-term prediction time windows and mid-term prediction time windows might have some "noise data" that cannot reflect the real change trend of time series data, the additional condition may be set with respect to short-term prediction time windows and mid-term prediction time windows, so as to make conditions for providing an update notification more strict.

For example, the additional condition for a mid-term prediction time window may be: errors $$e_k = \left| \frac{y_k - \hat{y}_k}{y_k} \right|$$

with respect to 70% of time points within the prediction time window are greater than or equal to 10%. The additional condition for a short-term prediction time window may be: errors $$e_k = \left| \frac{y_k - \hat{y}_k}{y_k} \right|$$

with respect to 90% of time points within the prediction time window are greater than or equal to 10%. In this example of the additional condition, percentages 70%, 90% and the error threshold (i.e., 10%) are only exemplary values, and those skilled in the art may set greater or smaller ones. In addition, these additional conditions are only exemplary instead of limiting, and those skilled in the art may use other embodiments according to an application environment without departing from the principle of the present invention.

Figure 6:
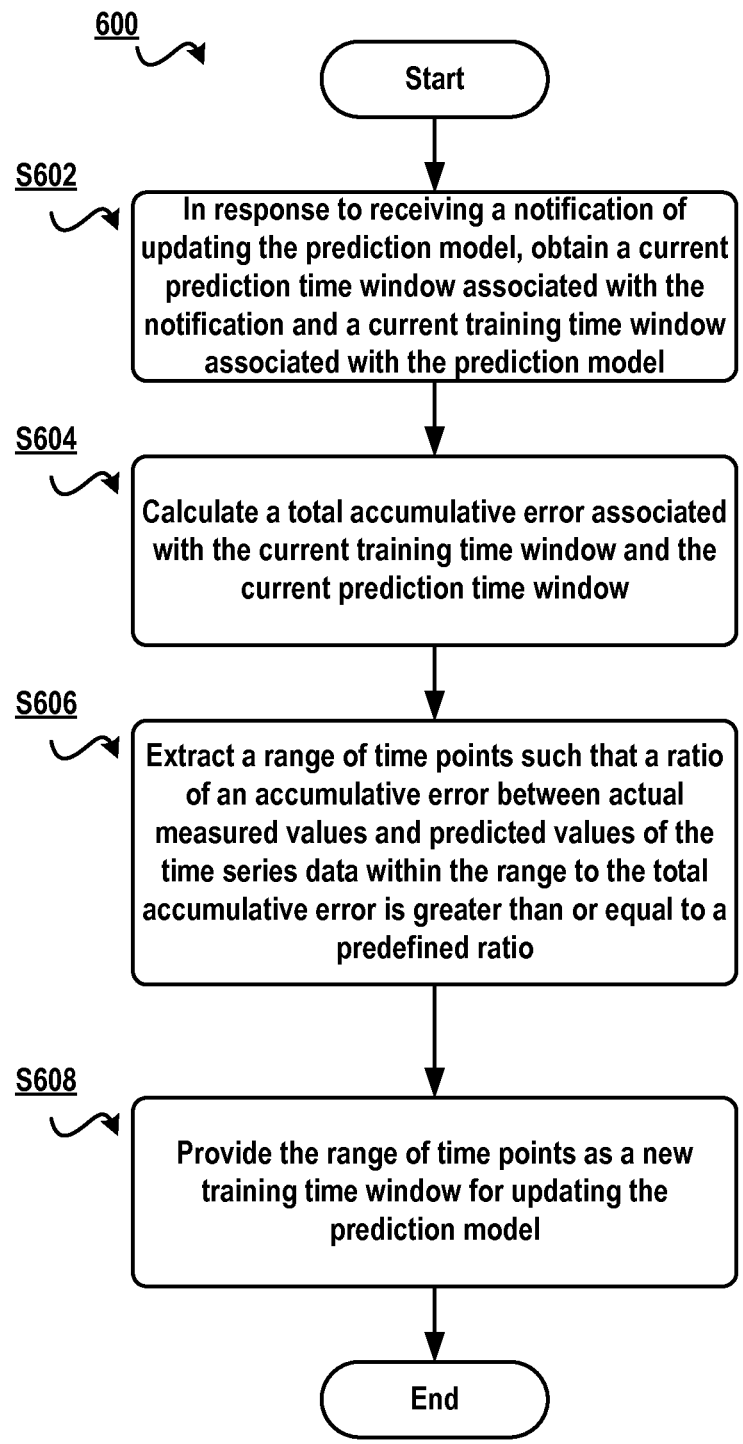
FIG. 6 shows a flowchart of a method for updating a prediction model used for time series data according to one embodiment of the present invention.
Figure 7:
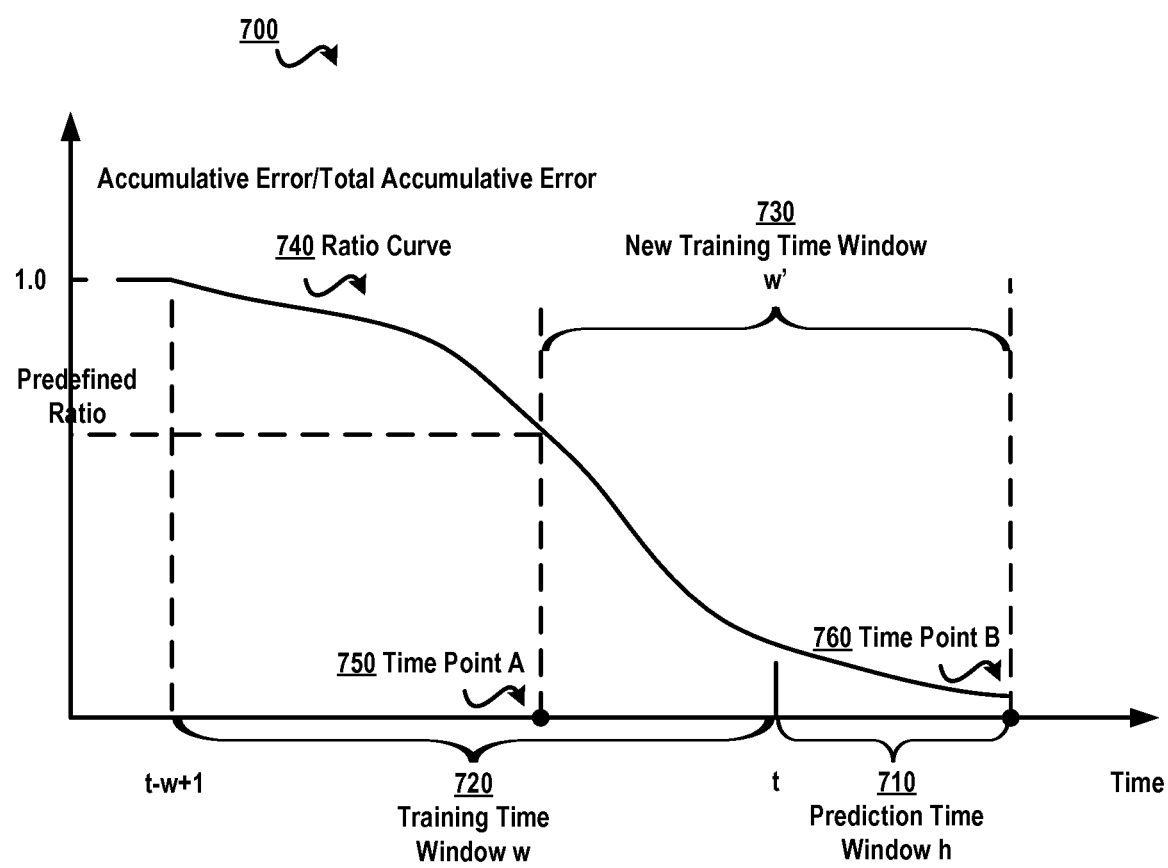
FIG. 7 shows a schematic view of obtaining a new prediction time window h' according to one embodiment of the present invention.

By means of the embodiments with reference to FIGS. 3 to 5, a notification of updating a current prediction model may be provided when the prediction model is no longer accurate. With reference to FIGS. 6 and 7, description is presented to how to select an appropriate range of historical data (i.e., new prediction time window) to generate a second, or new, prediction model after receiving the update notification.

Note once the update notification is received, it means the current prediction model is no longer accurate and a new prediction model needs to be generated. However, the range of time points on the basis of which the new prediction model is generated will affect the accuracy of the new model. At this moment, how to select an appropriate range of historical data becomes a challenge. Now returning to FIG. 2, as time elapses, a new current time point advances from the initial time point t to a time point t+h (i.e., the ending point of the prediction time window h), so a range before the time point t+h should be selected as a new training time window w'.

In one embodiment of the present invention, a sub-range in ranges covered by an old training time window w and the prediction time window h may be selected as the new training time window w'. A criterion for selection may be, for example: a sub-range that best reflects future changes of the time series data is to be selected from these ranges. Specifically, suppose there are a sub-range 1 (where measured values of the time series data show an upward trend) and a sub-range 2 (where measured values of the time series data show a downward trend), and current time series data still shows a downward trend. At this moment, historical data within sub-range 2 can better reflect future changes of the time series data, so sub-range 2 may be included into the new training time window.

Specifically, FIG. 6 shows a flowchart 600 of a method for updating a prediction model used for time series data according to one embodiment of the present invention. As shown in FIG. 6, in step S602, in response to receiving a notification of updating the prediction model, a first, or current, prediction time window h associated with the notification and a first, or current, training time window associated with the prediction model are obtained, wherein the notification is provided according to the above-described method. In this embodiment, the current prediction time window h associated with the notification and the current training time window associated with the prediction model are the current prediction time window h and the current training time window that are used in the method for updating a prediction model used for time series data.

In step S604, a total accumulative error, $ACC_h$, associated with the current training time window and the current prediction time window h is calculated. The total accumulative error $ACC_h$ can reflect a sum of errors that have accumulated when using the prediction model within ranges covered by the old training time window w and the prediction time window h; by comparing an accumulative error within a certain range with the total accumulative error $ACC_h$, the contribution of the accumulative error within this range to the total accumulative error $ACC_h$ may be determined In step S606, a range of time points is extracted such that a ratio, $$R = \frac{ACC_{w'}}{ACC_h},$$

of an accumulative error, $ACC_{w'}$, between actual measured values and predicted values of the time series data within the range to the total accumulative error $ACC_h$ is greater than or equal to a predefined ratio. When the selected range completely coincides with ranges covered by the old training time window w and the prediction time window h, the ratio R is equal to 1. In the embodiments of the present invention, a range causing the ratio R to be greater than or equal to a predefined ratio (for example, 70%) may be selected as a new training time window. Subsequently, in step S608 the range of time points is provided as a second, or new, training time window for updating the prediction model.

FIG. 7 shows a schematic view 700 of obtaining a new prediction time window, h', according to one embodiment of the present invention. As shown in FIG. 7, the prediction model is generated based on historical data collected within a training time window w 720 (where w represents the number of data points within the training time window) at a time point t (representing current time), and predicted values at various time points within a future prediction time window h 710 (wherein h represents the number of data points within the prediction time window) are predicted using the prediction model.

As shown in FIG. 7, the horizontal axis represents time, while the vertical axis represents the ratio $$R = \frac{ACC_{w'}}{ACC_h},$$

wherein $ACC_{w'}$ represents an accumulative error between actual measured values and predicted values of the time series data within a specific range, and $ACC_h$ represents the total accumulative error $ACC_h$.

For example, in an example shown in FIG. 7, the ratio R depicted by ratio curve 740, is associated with a range between a time point A 750 and a time point B 760 that is greater than or equal to a predefined ratio, at which point the range between time point A 750 and time point B 760 may be selected as a new training time window 730, w'.

In one embodiment of the present invention, the accumulative error is found using Equation 3, where w' is a new training time window, and the total accumulative error is found using Equation 4.

$$ACC_{w'} = \sum_{l=t+h}^{t+h-w'+1} e_l \qquad \text{Equation 3}$$

$$ACC_h = \sum_{l=t+h}^{t-w+1} e_l \qquad \text{Equation 4}$$

In the embodiments of the present invention, a range satisfying the predefined ratio may be obtained using the above equations. Note these equations are merely an example for measuring the contribution of a selected time range to the overall error. In the context of the present invention, those skilled in the art may use other implementations according to an application environment without departing from the principle of the present invention. For example, different weights may be assigned with respect to errors in different time periods, for example, a higher weight is assigned to errors in a time period close to current time; or those skilled in the art may further use other equations for implementation based on a concrete application environment according to statistics principles or probability distribution principles.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention comprises several means or modules, the means or modules configured to execute corresponding steps. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As detailed and complete description has been presented above, the apparatus is not detailed below.

Figure 8A:
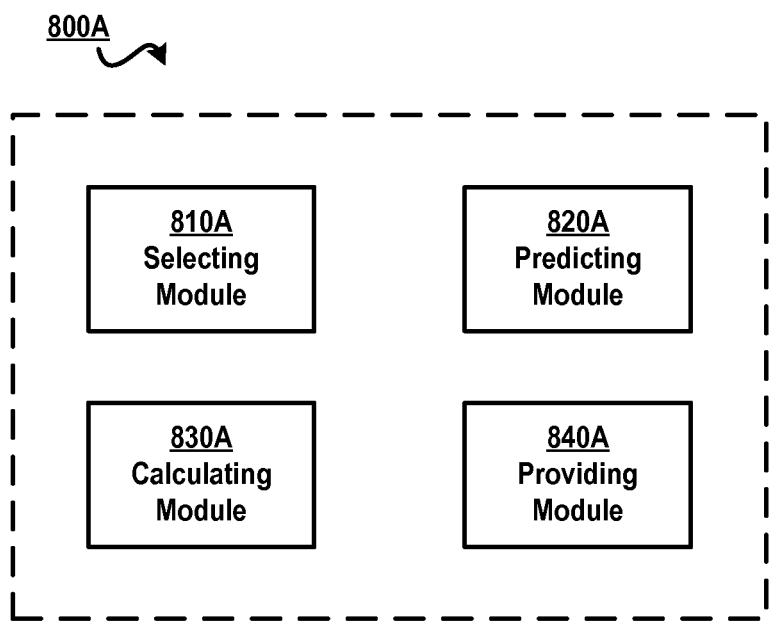
FIGS. 8A and 8B show block diagrams of apparatuses for updating a prediction model used for time series data according to one embodiment of the present invention, respectively.
Figure 8B:
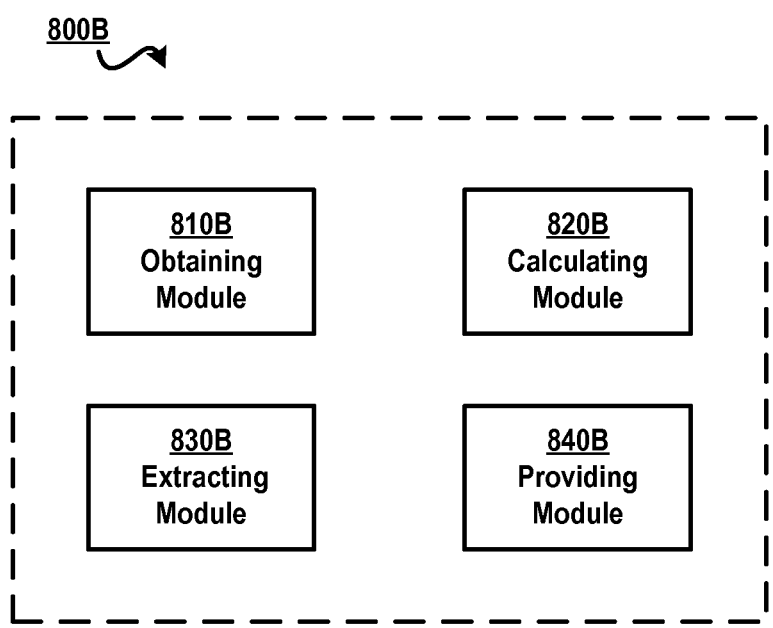

FIGS. 8A and 8B show respective block diagrams 800A and 800B of apparatuses for updating a prediction model used for time series data. As shown in FIG. 8A, there is provided an apparatus for updating a prediction model, comprising: a selecting module 810A configured to select a current prediction time window h in an order from a plurality of prediction time windows associated with the prediction model; a predicting module 820A configured to predict predicted values $\hat{y}_k$ of the time series data at various time points k within the current prediction time window h based on the prediction model; a calculating module 830A configured to calculate a prediction error MAPE associated with the current prediction time window h based on the predicted values $\hat{y}_k$ and actual measured values $y_k$ of the time series data at various time points k within the current prediction time window h; and a providing module 840A configured to provide a notification of updating the prediction model in response to the prediction error MAPE being larger than or equal to a predefined error threshold associated with the current prediction time window h.

In one embodiment of the present invention, the number of time points within a plurality of prediction time windows is variable.

In one embodiment of the present invention, the predefined error threshold associated with the current prediction time window h varies as the number of time points within the current prediction time window h varies.

In one embodiment of the present invention, the plurality of prediction time windows are divided into a plurality of levels according to the number of time points within the plurality of prediction time windows.

In one embodiment of the present invention, predefined error thresholds associated with prediction time windows at the same level are equal to one another.

In one embodiment of the present invention, starting time points of the plurality of prediction time windows are variable.

In one embodiment of the present invention, the order comprises at least one of: an increasing order by numbers of time points within the plurality of prediction time windows; a time order of starting points of the plurality of prediction time windows; and a random order.

In one embodiment of the present invention, calculating module 830A comprises: a first calculating module configured to calculate errors $$e_k = \left| \frac{y_k - \hat{y}_k}{y_k} \right|$$

between predicted values $\hat{y}_k$ and the actual measured values $y_k$ at various time points k within the current prediction time window h; and a second calculating module configured to calculate the prediction error $$MAPE = \frac{1}{h} \sum_{k=1}^{h} e_k.$$

As shown in FIG. 8B, there is provided an apparatus 800B for updating a prediction model used for time series data, comprising: an obtaining module 810B configured to, in response to receiving a notification of updating the prediction model, obtain a current prediction time window h associated with the notification and a current training time window associated with the prediction model, wherein the notification is provided according to the above-described apparatus; a calculating module 820B configured to calculate a total accumulative error $ACC_h$ associated with the current training time window and the current prediction time window h; an extracting module 830B configured to extract a range of time points such that a ratio of an accumulative error $ACC_{w'}$ between actual measured values and predicted values of the time series data within the range to the total accumulative error $ACC_h$ is greater than or equal to a predefined ratio; and a providing module 840B configured to provide the range of time points as a new training time window for updating the prediction model.

In one embodiment of the present invention, the accumulative error $$ACC_{w'} = \sum_{l=t+h}^{t+h-w'+1} e_l,$$ (Equation 3)

w' is a new training time window; and the total accumulative error $$ACC_h = \sum_{l=t+h}^{t-w+1} e_l.$$ (Equation 4)

By means of the method and apparatus of the present invention, while altering the architecture of an existing prediction method as less as possible, it is reminded when to update an existing prediction model so as to generate a new prediction model, and it is further provided on the basis of which range of historical data the new prediction model is generated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   establishing a first long time window that includes within it a plurality of medium time windows that respectively include within each of them a plurality of short time windows;
   receiving a first time series data set corresponding to data received during the first long time window;
   training a long time window prediction model with data of the first time series data set to determine that the training of the long time window prediction model does not result in increased accuracy in forecasting;
   responsive to the determination that the training of the long time window prediction model does not result in increased accuracy of forecasting, training a medium time window prediction model with a first portion of the first time series data set received during a first medium time window of the plurality of medium time windows to determine that the update to the medium time window prediction model does not result in increased accuracy in forecasting;
   responsive to the determination that the training of the medium time window prediction model does not result in increased accuracy of forecasting, training a short time window prediction model with a second portion of the first time series data set received during a first short time window of the plurality of short time windows to determine that the training of the short time window prediction model does result in increased accuracy forecasting; and
   responsive to the determination that the short time window prediction model results in increased accuracy in forecasting, making a forecast using the short time window prediction model.

2. The method of claim 1 wherein the determination that the training of the long time window prediction model not result in increased accuracy forecasting is based upon mean absolute percentage error (MAPE) measures.

3. The method of claim 1 wherein the determination that the training of the medium time window prediction model does not result in increased accuracy in forecasting is based upon mean absolute percentage error (MAPE) measures.

4. The method of claim 1 wherein the determination that the training of the short time window prediction model does result in increased accuracy forecasting is based upon mean absolute percentage error (MAPE) measures.

5. A computer program product (CPP) comprising:
   a set of storage device(s); and
   computer code stored collectively in the set of storage device(s), with the computer code including data and instructions to cause a processor(s) set to perform at least the following operations:
   establishing a first long time window that includes within it a plurality of medium time windows that respectively include within each of them a plurality of short time windows,
   receiving a first time series data set corresponding to data received during the first long time window,
   training a long time window prediction model with data of the first time series data set to determine that the training of the long time window prediction model does not result in increased accuracy in forecasting,
   responsive to the determination that the training of the long time window prediction model does not result in increased accuracy of forecasting, training a medium time window prediction model with a first portion of the first time series data set received during a first medium time window of the plurality of medium time windows to determine that the update to the medium time window prediction model does not result in increased accuracy in forecasting,
   responsive to the determination that the training of the medium time window prediction model does not result in increased accuracy of forecasting, training a short time window prediction model with a second portion of the first time series data set received during a first short time window of the plurality of short time windows to determine that the training of the short time window prediction model does result in increased accuracy forecasting, and
   responsive to the determination that the short time window prediction model results in increased accuracy in forecasting, making a forecast using the short time window prediction model.

6. The CPP of claim 5 wherein the determination that the training of the long time window prediction model not result in increased accuracy forecasting is based upon mean absolute percentage error (MAPE) measures.

7. The CPP of claim 5 wherein the determination that the training of the medium time window prediction model does not result in increased accuracy in forecasting is based upon mean absolute percentage error (MAPE) measures.

8. The CPP of claim 5 wherein the determination that the training of the short time window prediction model does result in increased accuracy forecasting is based upon mean absolute percentage error (MAPE) measures.

9. A computer system (CS) comprising:
a processor(s) set;
a set of storage device(s); and
computer code stored collectively in the set of storage device(s), with the computer code including data and instructions to cause the processor(s) set to perform at least the following operations:
establishing a first long time window that includes within it a plurality of medium time windows that respectively include within each of them a plurality of short time windows,
receiving a first time series data set corresponding to data received during the first long time window,
training a long time window prediction model with data of the first time series data set to determine that the training of the long time window prediction model does not result in increased accuracy in forecasting,
responsive to the determination that the training of the long time window prediction model does not result in increased accuracy of forecasting, training a medium time window prediction model with a first portion of the first time series data set received during a first medium time window of the plurality of medium time windows to determine that the update to the medium time window prediction model does not result in increased accuracy in forecasting,
responsive to the determination that the training of the medium time window prediction model does not result in increased accuracy of forecasting, training a short time window prediction model with a second portion of the first time series data set received during a first short time window of the plurality of short time windows to determine that the training of the short time window prediction model does result in increased accuracy forecasting, and
responsive to the determination that the short time window prediction model results in increased accuracy in forecasting, making a forecast using the short time window prediction model.

10. The CS of claim 9 wherein the determination that the training of the long time window prediction model not result in increased accuracy forecasting is based upon mean absolute percentage error (MAPE) measures.

11. The CS of claim 9 wherein the determination that the training of the medium time window prediction model does not result in increased accuracy in forecasting is based upon mean absolute percentage error (MAPE) measures.

12. The CS of claim 9 wherein the determination that the training of the short time window prediction model does result in increased accuracy forecasting is based upon mean absolute percentage error (MAPE) measures.

* * * * *